US007714699B2

(12) United States Patent
Wessels

(10) Patent No.: US 7,714,699 B2
(45) Date of Patent: May 11, 2010

(54) ANTENNA THROUGH THE USE OF LAMP ELECTRODES

(75) Inventor: Johannes Hendrik Wessels, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 855 days.

(21) Appl. No.: 10/599,848

(22) PCT Filed: Apr. 12, 2005

(86) PCT No.: PCT/IB2005/051201

§ 371 (c)(1), (2), (4) Date: Oct. 11, 2006

(87) PCT Pub. No.: WO2005/099346

PCT Pub. Date: Oct. 27, 2005

(65) Prior Publication Data

US 2008/0266834 A1 Oct. 30, 2008

(30) Foreign Application Priority Data

Apr. 15, 2004 (EP) .................................. 04101558

(51) Int. Cl.
*G05B 11/01* (2006.01)

(52) U.S. Cl. ............................ 340/310.11; 340/310.16; 340/825.72; 343/721; 315/149

(58) Field of Classification Search ............ 340/310.11, 340/310.16, 310.17, 539.1, 539.16, 539.17, 340/825.69, 825.72; 315/149, 158, 291, 315/294, 307, 344, 362; 343/721, 850, 853, 343/864, 865, 905
See application file for complete search history.

(56) References Cited

U.S. PATENT DOCUMENTS

| | | | | |
|---|---|---|---|---|
| 4,507,646 | A * | 3/1985 | Hamlin et al. | 455/402 |
| 4,654,562 | A * | 3/1987 | Berdat | 315/200 A |
| 5,424,859 | A | 6/1995 | Uehara et al. | |
| 5,623,256 | A | 4/1997 | Marcoux | |
| 6,636,005 | B2 * | 10/2003 | Wacyk et al. | 315/291 |
| 6,653,932 | B1 | 11/2003 | Beamish et al. | |
| 7,151,464 | B2 * | 12/2006 | Ramus | 340/825.72 |
| 2003/0090889 | A1 | 5/2003 | Wacyk et al. | |
| 2007/0183133 | A1 * | 8/2007 | Buij et al. | 362/85 |

FOREIGN PATENT DOCUMENTS

| | | | |
|---|---|---|---|
| CA | 1080316 | | 8/1980 |
| CN | 1273433 | | 11/2000 |
| EP | 0649210 | A1 | 4/1995 |
| GB | 2325070 | A | 11/1998 |
| WO | 03043384 | A1 | 5/2003 |

OTHER PUBLICATIONS

Written Opinion of the International Searching Authority PCT/IB2005/051201.

* cited by examiner

*Primary Examiner*—Haissa Philogene
(74) *Attorney, Agent, or Firm*—Thorne & Halajian, LLP

(57) ABSTRACT

A wireless control is provided for a lamp, such as a fluorescent lamp, controlled by a ballast with a wireless control interface for RF communication. The receiver input and the transmitter output of the control interface module are connected to one or more electrode wires by a coupling capacitor(s) or a Lecher line transformer. During operation the lamp electrodes serve as the lamp antenna.

12 Claims, 1 Drawing Sheet

ANTENNA THROUGH THE USE OF LAMP ELECTRODES

FIELD OF THE INVENTION

The invention relates to wireless control of a lamp and in particular relates to the architecture of the antenna of the lamp's control interface.

BACKGROUND OF THE INVENTION

Lighting control in an office or commercial building has gone through several stages ranging from "on/off"-control of a single lamp or a group of lamps, through dimming of a single lamp or a group of lamps, to advanced control of the lighting in an entire building. In normal lighting systems it is the individual lamp drivers of the luminaires that are controlled. The traditional lamp driver systems are wired control interface systems, such as the standard 1-10 V dimming interface and more recently digital systems, such as the Digital Addressable Lighting Interface (DALI). The interface systems are moving towards wireless interfaces, such as systems implementing the ZigBee standard, a system that uses radio frequencies around 2.4 GHz.

A wireless interface using electromagnetic signals needs an antenna for transmission and reception of control signals. For a lamp driver the situation is, however, complicated by the fact that the application has a metal housing. The housing will isolate an internal antenna from the environment, thereby largely blocking the transmission and reception of the electromagnetic signals. Furthermore the lamp driver itself can be enclosed in a metal housing that further attenuates the electromagnetic signals. In some technological areas this is not a problem. For example, a cellular phone has a plastic housing and the antenna can be located completely inside the application.

In the US patent application 2003/0090889 a ballast with an integrated RF wireless interface is disclosed. For a ballast with an embedded antenna, it is disclosed that in order to get the radiation outside the ballast, a plastic case may be used as a cover for the ballast, or in case of a metal cased ballast, a halfwavelength slot antenna may be used as the cover.

SUMMARY OF THE INVENTION

The present invention seeks to provide an improved wireless control interface for a lamp driver. Preferably, the invention alleviates or mitigates one or more of the above disadvantages singly or in any combination.

Accordingly in a first aspect, there is provided a device for wireless control of a lamp, the device comprising:

a control interface, and a body for emitting light, the body comprising at least a first electrode wherein the control interface is connected to the at least first electrode of the body, and wherein the at least first electrode is used as a first antenna for wireless control of the lamp.

In a wirelessly controlled lamp two features are necessarily fulfilled. The lamp is capable of emitting light to the surroundings and the control interface is capable of receiving control signals though connection to an antenna. In the present invention, these two features may be combined since the at least first electrode may be used in connection with generating and maintaining the emission of light, and may also be used as the antenna of the lamp. This is an advantage since a separate antenna may be avoided and thereby facilitating a simplified design of the control system of the lamp, leading to reducing cost of the system, smaller systems, etc. As an important consequence no restriction from the presence of an antenna is imposed on the design of the lamp driver housing, the material of the lamp driver housing, or on the surroundings of the lamp driver.

Irrespectively of the type of lamp and irrespectively whether the lamp driver is enclosed in a metal housing, the electrodes of a lamp, e.g. a fluorescent lamp, will always be placed so that they are in electromagnetic communication with the surroundings. Therefore the present invention may be implemented in any type of existing lamp system comprising at least a first electrode for generating and/or maintaining light emission. The implementation may be provided without use of extra connectors and/or without changes in the lamp driver housing and/or the luminaire. The lamp may be a fluorescent lamp, and more specifically it may be a fluorescent lamp of a TL type, a PL type or a HID type.

The wireless control interface of the present invention is a part of a lamp driver or is communicatively connected to the lamp driver circuitry. The term communicatively connected should be construed broadly. The term should be construed at least to include that the lamp driver and the control interface are an integral part of the same electronic circuitry, as well as the lamp driver and the wireless control interface are implemented in separate circuits that are electrically connected to each other by any suitable means for connecting two electrical circuits.

The control interface may be individually addressable and allow for bi-directional communication between the control interface and a user control device, such as a wall switch, or a control system, such as a computer control system adapted to control the lighting in a lighting system. A power source or feed source is normally connected to the luminaire, and the luminaire may include a stage communicatively connected to the control interface for handling the power supply in order to maintain light emission from the lamp. The lamp driver and/or the control interface may include processing means, the processing means may be any type of processing means capable of controlling the lamp. For example the processing means may be an electronic circuit including one or more microprocessors or an integrated circuit. The processing means may be connected to a storage means for reading and storing digital data, such as to a flash memory or an EEPROM.

The control interface may be adapted to receive and transmit, i.e. to operate, using a specific frequency. However, the system may also be adapted to operate in a specific frequency range, or at a multitude of different frequencies. The control interface may be adapted to operate in the radio frequency range, for example the radio frequency range utilized in the ZigBee standard, a system that uses radio frequencies around 2.4 GHz. The control interface may also be adapted to operate in the infra red frequency range or any other frequency range suitable for a wirelessly controlled lamp system.

The control interface may be connected to the electrodes through a capacitive circuit. The receiver input and the transmitter output of the control interface may be connected to one or more electrode wires through a capacitive circuit. The capacitive circuit may be a single capacitor, however the capacitive circuit may also be an electric circuit of two or more capacitors and possibly also other types of electrical components such as one or more resistors.

A fluorescent lamp will not activate until a certain threshold voltage difference or ignition voltage has been applied between the electrodes. The capacitive circuit may be adapted to be capable of withstanding the ignition voltages necessary to activate the fluorescent lamp. The capacitive circuit may be adapted to be capable of withstanding at least a few kilovolts, such as between 500 volts and 5 kilovolt, such as between 1 and 4 kilovolts, such as between 2 and 3 kilovolts. It may be a requirement that the capacitive circuit is able to withstand mains voltage and surges and have the same safety specifications as a standard mains filter capacitor.

The signal received by or imposed to the electrodes may as an alternative to a capacitive circuit be coupled to the control interface by means of a Lecher line transformer. In principle any inductive coupling circuit may be used for connecting the electrodes to the control interface.

The device may further include a user control comprising a second antenna so that signals can be transmitted to and/or received by the first antenna. The user control may be a wall switch, i.e. a switch or module attached to the wall from where one or more lamps can be controlled. The user control may also be a remote control, or a user control attached to other places than the traditional wall position.

According to a second aspect, wireless communication is established between a lamp driver and a control interface for controlling the lamp driver by use of at least a first electrode in a lamp as an antenna for the lamp.

According to a third aspect, wireless communication is established between a lamp driver and a control interface by a method of transmitting and/or receiving signals, where a lamp comprising a first antenna and a user unit comprising a second antenna, the first antenna being an at least first electrode of the luminous body of the lamp.

These and other aspects, features and/or advantages of the invention will be apparent from and elucidated with reference to the embodiments described hereinafter.

BRIEF DESCRIPTION OF THE DRAWINGS

Preferred embodiments of the invention will now be described in details with reference to the drawings in which.

In the drawings like reference numerals are used for like features in the different drawings.

DESCRIPTION OF PREFERRED EMBODIMENTS

Figure 1:
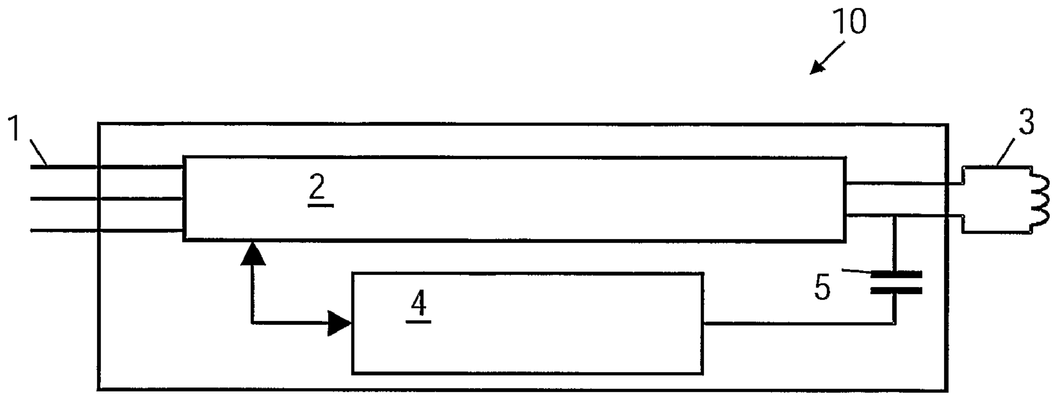
FIG. 1 illustrates a first embodiment of a device according to the present invention.

A first embodiment of a device 10 according to the present invention is illustrated in FIG. 1. The lamp is in the illustrated embodiment a fluorescent lamp. The figure illustrates the main components present in a lamp driver. The lamp driver is connected to mains 1 for example by direct cable connection to live (L), neutral (N) and possible protective earth (PE) of a mains network. The lamp driver comprises a driver circuit 2 capable of controlling light emission, thus capable of at least starting the emission process of a fluorescent lamp and maintaining a substantially constant light emission level from the lamp. The lamp driver circuitry is communicatively connected to a control interface 4. The control interface 4 being able to extract or impose an alternating signal from or to the at least first electrode 3 by use of a capacitive coupling 5.

The control interface 4 receives or transmits data to or from an external unit through the at least first electrode 3 being the antenna. In the receiving mode, the control interface may receive modulated data via the antenna, the data may then be demodulated and processed by an electric circuitry being part of the control interface. The data is further processed into control signals for controlling the lamp driver 2. In the transmitting mode, data may be modulated and transmitted via the antenna to an external unit.

Figure 2:
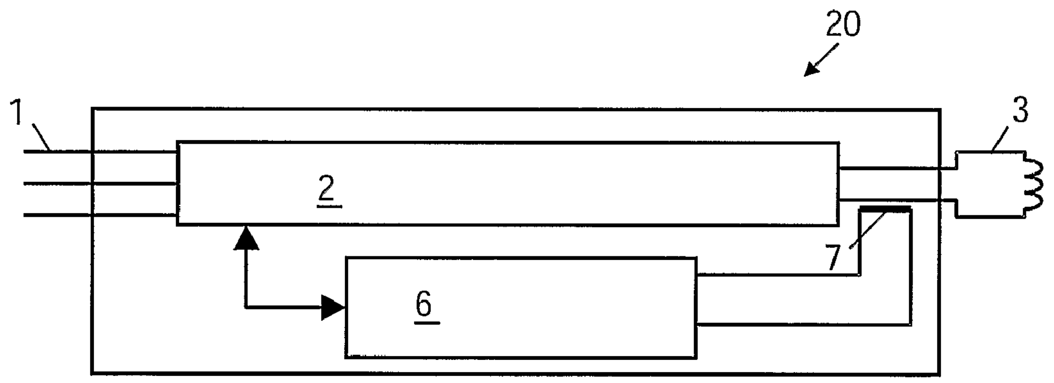
FIG. 2 illustrates a second embodiment of a device according to the present invention.

In FIG. 2 a different embodiment 20 is illustrated. In this embodiment the control interface 6 is able to extract or impose an alternating signal from or to the least first electrode 3 by means of an inductive coupling 7. As an example of an inductive coupling a Lecher line transformer may be used.

Figure 3:
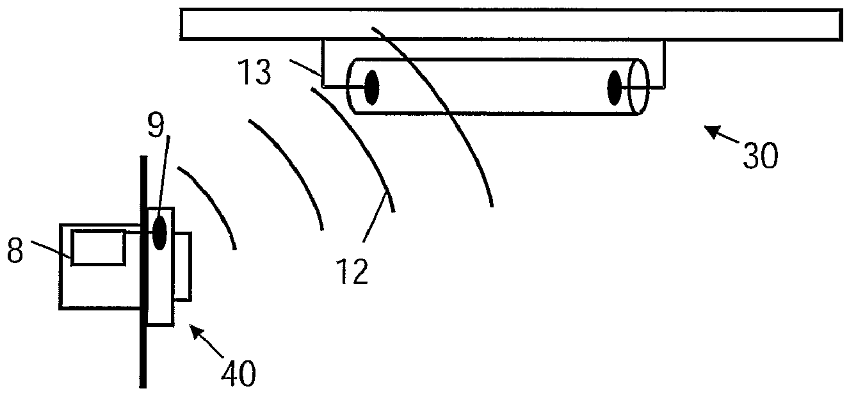
FIG. 3 illustrates wireless communication between a wall unit and a fluorescent lamp.

Wireless communication between a wall unit 40 and a fluorescent lamp 30 is illustrated in FIG. 3. The wall unit acts as an interface for a user to communicate control signals to the lamp, such as turning the lamp on or off, dim the ballast of a fluorescent lamp, etc. The wall unit comprises a wireless communication circuit 8 including an antenna 9. The antenna may be completely comprised within the wall unit by fabricating the wall unit in a suitable material, such as a material which is transparent to electromagnetic radiation, e.g. plastic.

The wall unit may transmit an electromagnetic signal 12 that can be received by the lamp by use of one of the electrodes 13 as an antenna. The antenna being connected to the lamp driver as described in connection with FIGS. 1 and 2. In FIG. 3 a signal is transmitted from the wall unit to the lamp, the reverse may also be possible, i.e. to transmit a signal from the lamp to the wall unit.

The wall unit may be electrically powered by means of a battery, it may be connected to a mains network, etc. Alternatively, the wall unit may be powered mechanically, such as by energy gained from pressing a button of the unit.

The user control is in the present figure illustrated by a wall unit. The user control may be any type of unit for controlling a lamp. The user control may e.g. be a transceiver box connected to a light control system, e.g. in connection with a light control system of a building.

In the foregoing, it will be appreciated that reference to the singular is also intended to encompass the plural and vice versa, and references to a specific numbers of features or devices are not to be construed as limiting the invention to that specific number of features or devices. Moreover, expressions such as “include”, “comprise”, “has”, “have”, “incorporate”, “contain” and “encompass” are to be construed to be non-exclusive, namely such expressions are to be construed not to exclude other items being present.

Although the present invention has been described in connection with specific embodiments, it is not intended to be limited to the specific form set forth herein. Rather, the scope of the present invention is limited only by the accompanying claims.

Reference signs are included in the claims, however the inclusion of the reference signs is only for clarity reasons and should not be construed as limiting the scope of the claims.

The invention claimed is:

1. A device for wireless control of a lamp, the device comprising:

a control interface, and a body for emitting light, the body comprising at least a first electrode located inside the body;

wherein the control interface is connected to the at least first electrode of the body, and wherein the at least first electrode is used as a first antenna for wireless control of the lamp including reception and transmission of data included in a control signal.

2. The device according to claim 1, wherein the control interface is connected to the at least first electrode through a capacitive circuit.

3. The device according to claim 2, wherein the lamp is a fluorescent lamp, and wherein the capacitive circuit withstands an ignition voltage necessary to activate the fluorescent lamp.

4. The device according to claim 1, wherein the control interface is coupled to the at least first electrode through an inductive coupling.

5. The device according to claim 1, wherein the control interface is capable of receiving and/or transmitting a radio frequency signal via the first antenna.

6. The device according to claim 1, further including a user control and wherein the user control comprises a second antenna so that signals are transmitted to the first antenna.

7. The device according to claim 1, further including a user control and wherein the user control comprises a second antenna so that signals are received from the first antenna.

8. The device of claim 1, wherein the control signal received by the at least first electrode causes dimming of the lamp.

9. The device of claim 1, wherein the wireless control of the lamp is in response to the reception the data included in the control signal by the at least first electrode from a user control device having a second antenna for the transmission of the data included in the control signal to the at least first electrode.

10. The device of claim 1, wherein the control signal received by the at least first electrode turns the lamp on or off.

11. A method of controlling a lamp having a body and at least one electrode inside the body for generating and maintaining emission of light by the lamp, the method comprising the acts of:

wirelessly transmitting data included in a control signal from an interface to a lamp controller connected to the at least one electrode;

wirelessly receiving the data included in the control signal by the at least one electrode acting as an antenna; and controlling the emission of the light in response to the data included in the control signal received by the at least one electrode located inside the body.

12. The method of claim 11, wherein the controlling act includes at least one of turning the lamp on or off, and dimming the emission of the light from the lamp.

* * * * *